United States Patent
Appelo

(10) Patent No.: US 9,993,762 B2
(45) Date of Patent: *Jun. 12, 2018

(54) QUIET PULSE VALVE

(71) Applicant: General Electric Technology GmbH, Baden (CH)

(72) Inventor: Per-Erik Albert Appelo, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 82 days.

This patent is subject to a terminal disclaimer.

(21) Appl. No.: 13/892,774

(22) Filed: May 13, 2013

(65) Prior Publication Data

US 2014/0332039 A1    Nov. 13, 2014

(51) Int. Cl.
*B01D 46/04* (2006.01)
*F16K 47/02* (2006.01)
*F16K 31/122* (2006.01)

(52) U.S. Cl.
CPC ............ *B01D 46/04* (2013.01); *F16K 31/122* (2013.01); *F16K 47/02* (2013.01)

(58) Field of Classification Search
None
See application file for complete search history.

(56) References Cited

U.S. PATENT DOCUMENTS

| | | | |
|---|---|---|---|
| 865,479 A | 9/1907 | Cooper | |
| 914,886 A | 3/1909 | Schreidt | |
| 926,400 A | 6/1909 | Freaney | |
| 1,548,093 A | 8/1925 | McCormick | |
| 2,476,400 A | 7/1949 | Berkholder | |
| 2,541,176 A | 2/1951 | Rockwell | |
| 3,253,615 A | 5/1966 | Armstrong | |
| 3,446,473 A | * 5/1969 | Barker | ................ F16K 31/0651 251/129.05 |
| 4,190,230 A | * 2/1980 | Geissbuhler | ....... B01D 46/0068 251/30.02 |
| 4,198,029 A | 4/1980 | Johnson | |
| 4,760,865 A | 8/1988 | Rilett | |

(Continued)

FOREIGN PATENT DOCUMENTS

CN    2191330 Y    3/1995
CN    200961711 Y    10/2007

(Continued)

OTHER PUBLICATIONS

Trimec Dust Filters Components: SPV High Efficiency Sonic Piston Valve, 2010, pp. 1-4, Trimec S.r.l.—Via Gramsci, 57-20032 Cormaho (Milano)—Italy. www.trimecvalves.com.

(Continued)

*Primary Examiner* — Nicole Blan
*Assistant Examiner* — Pradhuman Parihar
(74) *Attorney, Agent, or Firm* — GE Global Patent Operation; Rita D. Vacca

(57) ABSTRACT

A relatively quiet pulse valve and a method of using the pulse valve are provided. The pulse valve includes a dampening mechanism to decrease mechanical stresses, decrease operating noise, decrease compressed air waste and increase operational life expectancy of the valve. Such dampening mechanism is arranged within an internal area of the pulse valve housing.

10 Claims, 1 Drawing Sheet

(56) References Cited

U.S. PATENT DOCUMENTS

| | | | |
|---|---|---|---|
| 4,793,589 | A | 12/1988 | Eldredge et al. |
| 5,002,594 | A | 3/1991 | Merritt |
| 5,042,775 | A | 8/1991 | Willemsen |
| 5,178,652 | A | 1/1993 | Huttlin |
| 5,533,706 | A * | 7/1996 | Aurell .............................. 251/44 |
| 5,657,790 | A | 8/1997 | Mohn |
| 5,887,973 | A | 3/1999 | Ahman et al. |
| 7,204,211 | B2 | 4/2007 | Kenchington et al. |
| 2004/0036044 | A1* | 2/2004 | Hirota .................. F25B 41/062 251/30.02 |
| 2005/0210842 | A1 | 9/2005 | McCausland |
| 2006/0123753 | A1 | 6/2006 | Sugiura et al. |
| 2008/0022641 | A1 | 1/2008 | Engelland et al. |
| 2010/0108927 | A1 | 5/2010 | Perz et al. |
| 2011/0000174 | A1 | 1/2011 | Kapelarie et al. |
| 2011/0206572 | A1 | 8/2011 | McKenna et al. |
| 2012/0073251 | A1 | 3/2012 | Troxell et al. |
| 2012/0138104 | A1* | 6/2012 | Haynam et al. ................ 134/33 |
| 2013/0153039 | A1 | 6/2013 | Deubler |
| 2014/0332038 | A1* | 11/2014 | Appelo .................. B01D 46/04 134/37 |
| 2015/0123460 | A1* | 5/2015 | Prescott .................. B60T 8/327 303/40 |

FOREIGN PATENT DOCUMENTS

| | | | |
|---|---|---|---|
| CN | 101293158 | A | 10/2008 |
| CN | 201462062 | U | 5/2010 |
| CN | 101879395 | A | 11/2010 |
| CN | 202158221 | U | 3/2012 |
| CN | 202460368 | U | 10/2012 |
| EP | 0651187 | A1 | 5/1995 |
| EP | 1085244 | A2 | 3/2001 |
| EP | 1493480 | A1 | 1/2005 |
| EP | 2 390 539 | A1 | 11/2011 |
| EP | 2390539 | * | 11/2011 ............... F16K 3/24 |
| FR | 2652631 | A1 | 4/1991 |
| WO | 91/19922 | A1 | 12/1991 |
| WO | 199718026 | A1 | 5/1997 |
| WO | 01/29465 | A1 | 4/2001 |
| WO | 2013138092 | A2 | 9/2013 |

OTHER PUBLICATIONS

European Search Report dated Oct. 28, 2014 for EP Appln. No. 14166204.9.

Solenoid diaphragm valves for bag house (HJ/T284-2006), State Environmental Protection Administration, Jul. 28, 2006, p. 63.

Office action issued from Chinese Patent Office dated Dec. 31, 2015 for CN Application No. 201410199937.6.

European Search Report and Written Opinion issued in connection with related EP Application No. 12154678.2-2113 dated Jul. 5, 2012.

International Search Report and Written Opinion issued in connection with related PCT Application No. PCT/IB32013/050842 dated May 24, 2013.

"Goyen CP Series—Close Pitched Valve", Aluminium Body X-Spool, Rev. 01, Apr. 2015.

"Goyen CP Series—Close Pitched Valve", Manifold System, Rev. 01, Apr. 2015.

Office Action issued in connection with related CN Application No. 201380008903.8 dated May 4, 2015.

Final Rejection towards related U.S. Appl. No. 13/892,683 dated May 13, 2015.

Non-Final Rejection towards related U.S. Appl. No. 14/328,029 dated May 13, 2015.

Final Rejection towards related U.S. Appl. No. 13/892,938 dated May 15, 2015.

Office Action issued in connection with related AU Application No. 2013217250 dated May 27, 2015.

Office Action issued in connection with related CN Application No. 201410199023.X dated Dec. 31, 2015.

Office Action issued in connection with related CN Application No. 201410199840.5 dated Jan. 4, 2016.

European Search Report and Written Opinion issued in connection with related EP Application No. 15183812.5-1751 dated Mar. 3, 2016.

Non-Final Rejection towards related U.S. Appl. No. 13/892,683 dated Aug. 5, 2016.

Office Action issued in connection with related CN Application No. 201410199840.5 dated Aug. 11, 2016.

Non-Final Rejection towards related U.S. Appl. 14/850,208 dated Dec. 9, 2016.

Non-Final Rejection towards related U.S. Appl. No. 14/488,642 dated Mar. 1, 2017.

Final Rejection towards related U.S. Appl. No. 13/892,683 dated Feb. 3, 2017.

U.S. Final Office Action issued in connection with related U.S. Appl. No. 14/850,208 dated May 22, 2017.

* cited by examiner

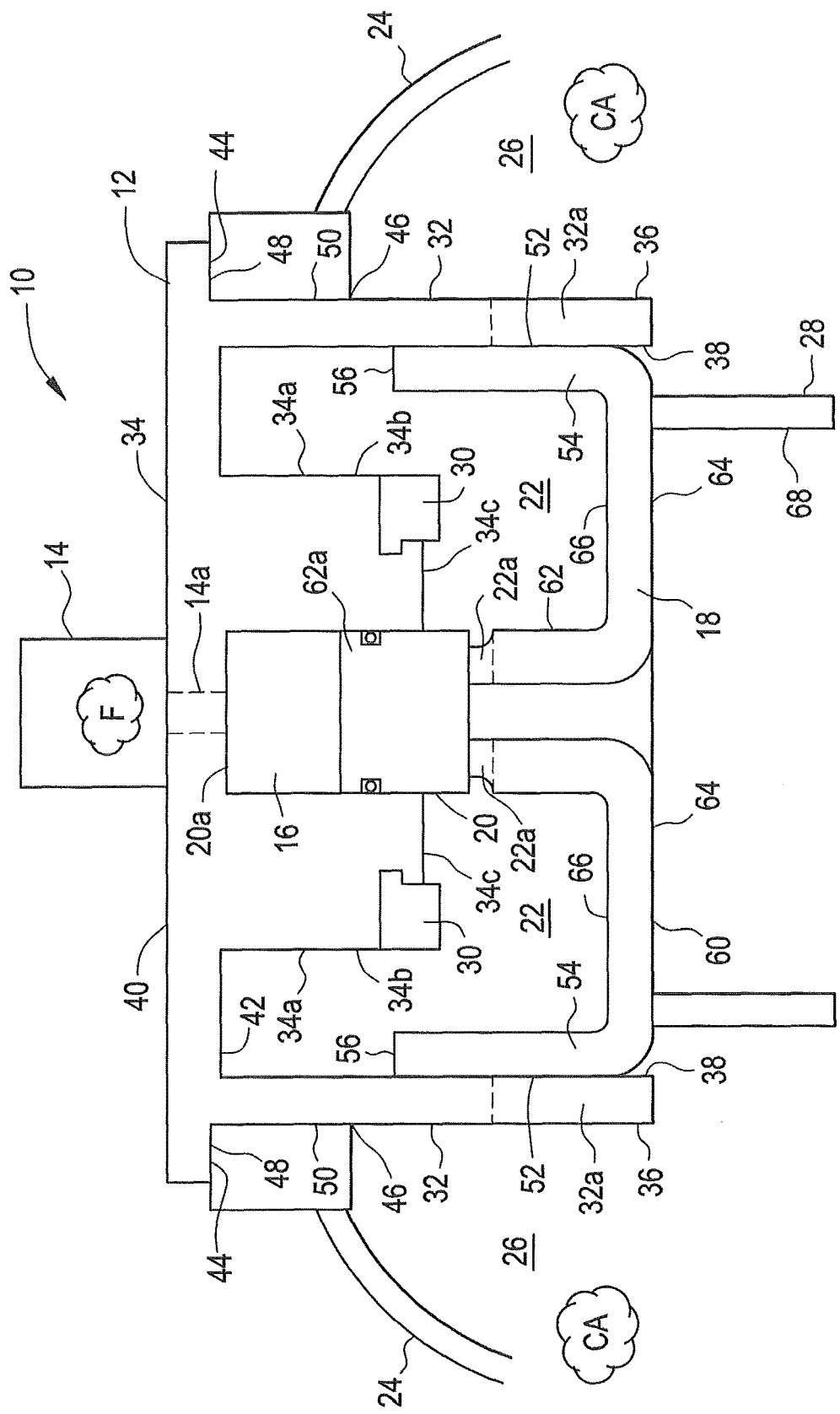

QUIET PULSE VALVE

FIELD OF THE INVENTION

In general, the present disclosure relates to a cleaning valve useful for cleaning at least a portion of a filter unit, such as filter bags, arranged in a filter installation useful for filtering polluted gas passed therethrough. More specifically, the present disclosure relates to a relatively quiet cleaning valve with a dampening mechanism that enables increased tank pressure for increased filter area cleaning per cleaning valve without jeopardizing cleaning valve reliability.

BACKGROUND OF THE INVENTION

Commercial "bag house" type filter installations typically consist of a plurality of parallel filter units, each containing a plurality of parallel rows of vertically arranged filter elements in the form of filter bags. Each such filter bag has a top end opening. A gas polluted with particulates is channeled through the filter bags to filter and collect particulates entrained in the gas. Hence, upon filtering and collecting the particulates entrained in the gas, a "cleaned gas" is produced. More specifically, cleaned gas is produced by channeling a polluted gas into a filter installation for passage through one or more filter units for gas flow from an exterior surface of a plurality of filter bags through to an interior area within the filter bags via flow through the sides of the filter bags. As the polluted gas passes from the exterior surface of the filter bags through to the interior area within the filter bags, particulate pollutants entrained in the gas are filtered and collected forming dust cakes on the exterior surfaces of the filter bags. Hence, gas in the interior area of the filter bags is the so produced cleaned gas. Cleaned gas exits the interior areas of the filter bags via a top end opening in each such filter bag. Cleaned gas flows from the top end openings through an outlet duct common to the filter units. During operation of the filter installation, a negative pressure is typically generated by a fan arranged downstream of the filter installation to cause gas flow through the filter units and filter bags.

As noted above, dust and particulates entrained in the polluted gas are filtered by and collected on the exterior surfaces of the filter bags, thus forming dust cakes thereon. Cleaning of the filter bags to remove the dust cakes is necessary for effective and efficient equipment performance. Cleaning of the filter bags is accomplished using a pressure medium in the form of compressed air pulses injected into the filter bags in a direction opposite to that of gas filtering. Rows of filter bags are cleaned successively using cleaning units arranged for each such given row. A cleaning unit cleans a row of filter bags by generating a compressed air pulse delivered substantially simultaneously to each filter bag in the given row. More specifically, each cleaning unit comprises a nozzle pipe arranged above and extending the length of the associated row of filter bags for cleaning. Each nozzle pipe includes a distribution pipe with a plurality of vertically downwardly projecting pipe sockets connected thereto. Each pipe socket is positioned straight above a filter bag top end opening within the associated row. The function of these pipe sockets is to direct via nozzles compressed air pulses into the respective filter bag top end openings. The pipe sockets usually have a diameter of about 1.5 to 2 times greater than the diameter of the nozzle associated therewith. The nozzles associated therewith consist of circular holes of varying diameter formed in the distribution pipe. The varying diameter of the circular holes along the distribution pipe is determined empirically based on the total number of pipe sockets/nozzles, requiring a uniform distribution of compressed air pulsed therethrough. As such, circular holes arranged in the distribution pipe a greater distance from the nozzle pipe are larger in diameter than those of circular holes arranged in the distribution pipe a lesser distance from the nozzle pipe. By so varying the diameter of the circular holes, a uniform distribution of compressed air pulsed therethrough is achieved.

In the cleaning of filter bags using a pulse of compressed air, a valve is temporarily opened to establish fluid flow between a compressed air tank and the nozzle pipe. Upon fluid flow between the compressed air tank and the nozzle, compressed air is pulsed through the nozzle pipe and its associated distribution pipe, pipe sockets and nozzles. As such, a compressed air pulse is supplied to each of the filter bags in the associated row of filter bags. Compressed air pulses supplied to the filter bags dislodge dust and particulates that collect and cake in and on the walls of the filter bags. Dust cakes formed on the filter bags are thereby loosened by the flow of compressed air from the interior areas of the filter bags, through the filter bag side walls, to an area in the filter unit exterior thereto. The resultant loosened dust cakes fall off the exterior of the filter bags for hopper collection.

In operating a cleaning unit, it is essential that the above-described pulse valve delivers a cleaning pulse of compressed air at a relatively high pressure with a relatively low consumption of compressed air. Pulse valves function by a cavity behind a plunge or membrane emptying through either a solenoid valve or a pilot valve, whereby the plunge or membrane is displaced by the differential pressure between the air tank pressure on one side of the plunge or membrane and the cavity pressure on the other side of the plunge or membrane. The plunge or membrane undergoes considerably acceleration and achieves considerable velocity upon displacement as a result of this pressure differential. Eventually the plunge or membrane impacts an end position with very high momentum. The plunge or membrane impacting the end position with very high momentum creates a significantly loud noise upon impact. Likewise, when the plunge or membrane impacts the end position, such impact creates relatively high mechanical stresses. Mechanical stresses on the valve shorten the operational life expectancy of the valve and add to the system's operation costs when performance is hampered and/or replacement is necessary. Further, the plunge or membrane typically bounces with several pressure peaks upon impacting the end position causing compressed air waste. Hence, to increase system performance and decrease system operational costs, a valve with decreased mechanical stresses, decreased operational noise, decreased compressed air waste and increased operational life expectancy is desired.

SUMMARY OF THE INVENTION

In view of the above, disclosed herein is a relatively quiet pulse valve and a method of using the relatively quiet pulse valve for pulsed compressed air cleaning of a plurality of filter elements, such as filter bags, with decreased valve mechanical stresses, decreased valve operational noise, decreased compressed air waste and increased valve operational life expectancy. As such, the subject pulse valve device useful for pulsed compressed air cleaning of at least a portion of a filter unit comprises a housing with a plunge slideably positioned therein. The housing is arranged in an opening of a pressure vessel, or compressed air tank, containing compressed air having a pressure of about 10 pounds per square inch (psi) to about 100 psi, or about 60 psi. A plurality of openings is formed in the housing for the flow of compressed air from the pressure vessel through the housing and into a nozzle pipe. Compressed air flows through the nozzle pipe for effective cleaning at least a portion of a filter unit when the plunge is in a second position, or "open" position.

A fluid supply fluidly connected to or on the housing for supply of a fluid to an interior area or cavity within the housing causes movement of the plunge to a first position, or "closed" position. When in the first position, the plunge blocks the plurality of openings in the housing and thus blocks the flow of compressed air from the pressure vessel or compressed air tank to the nozzle pipe.

Compressed air in the pressure vessel or compressed air tank has a pressure of about 10 psi to about 100 psi, or about 60 psi. When the plunge is in the first position, the fluid pressure within the interior area or cavity of the housing is significantly less than that of the compressed air within the pressure vessel. When the plunge is in the second position, the fluid pressure within the interior area or cavity of the housing is significantly greater than that of the compressed air within the pressure vessel.

A dampening mechanism, such as one or more cushions, is arranged inside the pulse valve housing to reduce or dampen the impact between the housing and the plunge upon movement of the plunge into the first position. Cushioning the impact between the housing and the plunge reduces mechanical stresses caused by such impacts and improves valve reliability even with higher tank pressure. The internal dampening mechanism likewise reduces the impact noise of the plunge upon displacement or movement of the plunge into the first position. In addition to the dampening mechanism, fluid within the interior area or cavity of the housing provides a cushioning effect that reduces impact and impact noise of the plunge upon movement thereof into the first position.

A method of using the subject pulse valve device for cleaning at least a portion of a filter unit comprises increasing fluid pressure within an interior area or cavity of a valve housing to cause pressure differential displacement or movement of a plunge into a second position allowing flow of compressed air from a pressure vessel or compressed air tank through a nozzle pipe in fluid connection with a filter unit thereby cleaning the filter unit with a pulse of compressed air. Reducing fluid pressure within an interior area or cavity of the valve housing likewise causes pressure differential displacement or movement of the plunge into a first position blocking flow of compressed air from the pressure vessel or compressed air tank and hence from the nozzle pipe until a further pulse cleaning of the filter unit is indicated by buildup of a dust cake.

For purposes of this method, the compressed air in the pressure vessel has a pressure of about 10 psi to about 100 psi, or about 60 psi. When the plunge is in the first position, the fluid pressure within the interior area of the housing is significantly less than that of the compressed air within the pressure vessel or compressed air tank. When the plunge is in the second position, the fluid pressure within the interior area of the housing is significantly greater than that of the compressed air within the pressure vessel. Pressure within the housing is controlled using a solenoid valve or the like for purposes of the subject method to control fluid flow to the interior area of the housing to thus control the pressure differential between that of the interior area and that of the compressed air tank.

The subject method further comprises providing a dampening mechanism within the housing to reduce or cushion the impact between the housing and the plunge upon movement of the plunge into the first position. Providing a dampening mechanism as herein described also reduces the impact noise of the plunge with the housing upon movement of the plunge into the first position. Fluid within the interior area of the housing likewise provides a cushioning effect to reduce impact and impact noise of the plunge upon movement of the plunge into the first position.

The subject pulse valve device and method for using the same to clean at least a portion of a filter unit, such as filter bags, arranged in a filter installation to filter polluted gas passed therethrough includes among other features noted, a dampening mechanism that enables increased tank pressure for increased filter area cleaning per cleaning valve without jeopardizing cleaning valve reliability.

BRIEF DESCRIPTION OF THE DRAWINGS

The present invention will now be described in more detail with reference to the accompanying drawings.

FIG. 1 is a side cross-sectional view of a pulse valve device according to the present invention.

DETAILED DESCRIPTION

A relatively quiet pulse valve useful for effective compressed air pulsed cleaning of a plurality of filter elements, such as filter bags, with decreased valve mechanical stresses, decreased valve operational noise, decreased compressed air waste and increased valve operational life expectancy are described herein. As illustrated in FIG. 1, the subject valve device 10 comprises a plunge valve housing 12. Plunge valve housing 12 is manufactured of a sturdy natural, e.g., iron, aluminum, or other metal, or synthetic, e.g., plastic, resin or other polymer, material suitably rigid and durable for robust industrial uses and forces. Plunge valve housing 12 is formed with sides 32 having openings 32a, unitarily formed with or securely attached to a top 34. Sides 32 include an exterior surface 36 and an interior surface 38. Top 34 includes an exterior surface 40 and an interior surface 42. Extending from interior surface 42 of top 34 is interior member 34a. Interior member 34a is formed with opposed sides 34b and free end 34c. At the juncture of opposed sides 34b with free end 34c are one or more dampening mechanisms or cushions 30. Cushions 30 may be manufactured from natural or synthetic rubber, silicone or a like flexible material capable of providing cushioning effects upon repeated impact between solid surfaces. Top 34 extends outwardly beyond exterior surface 36 to form a lip 44. As such, housing 12 is positioned within an opening 46 of a pressure vessel 24 with lip 44 abutting extended edge 48 of opening 46 with at least a portion of exterior surface 36 in contact with surface 50 of opening 46 for an airtight seal therebetween. In interior area 26 of pressure vessel 24 is compressed air "CA".

Slideably positioned within interior area 22 of housing 12 is a plunge 18. Plunge 18 is likewise manufactured of a sturdy natural, e.g., iron, aluminum, or other metal, or synthetic, e.g., plastic, resin or other polymer, material suitably rigid and durable for robust industrial uses and forces. Exterior surfaces 52 of sides 54 of plunge 18 contact interior surfaces 38 of sides 32 of housing 12 for an air tight seal therebetween. Extending between sides 54 of plunge 18 opposite free ends 56 is a base 60 with a center plug portion 62 extending therefrom into interior 22 of housing 12. Plug portion 62 is manufactured to extend from interior surface 66 of base 60 opposite exterior surface 64 of base 60. Interior surface 66 of plunge 18 is in fluid communication with interior 68 of nozzle pipe 28. Between interior surface 66 of plunge 18 and interior surface 42 of top 34 of housing 12 is interior area 22. The area "A" of interior area 22 varies as plunger 18 moves or slides within housing 12. The area A of interior area 22 is minimized when base 60 of plunge 18 moves toward housing 12 for contact of free ends 56 of base 60 with interior surface 42 of top 34 of housing 12. In this first or "closed" position, base 60 interior surface 66 contacts pliable dampening mechanisms 30 and resilient portion 62a of plug portion 62 slides within opening 20 to abut sealing seat 20a of housing 12 causing fluid "F" to flow from cavity 16 into solenoid valve 14 integrally formed with or securely affixed to housing 12. In this first or "closed" position, cavity 16 is an area of low pressure causing resilient portion 62a to slide into contact with interior surface 42 of top 34.

The area A of interior area 22 is maximized when pressure within cavity 16 is increased by a flow of fluid F from solenoid valve 14 through passage 14a into cavity 16. As such, resilient portion 62a of plunge 18 moves outwardly from cavity 16. Upon outward movement of resilient portion 62a from cavity 16, compressed air CA from pressure vessel 24 flows through openings 32a in sides 32 of housing 12 and into internal area 22. Fluidly connected to internal area 22 via duct 22a is plunge passage 18a. Plunge passage 18a is fluidly connected to nozzle pipe 28. In this second or "open" position, plunge 18 is positioned within housing 12 to allow compressed air CA flow through openings 32a, interior area 22, duct 22a and into nozzle pipe 28. Likewise, plug portion 62 moves a distance out of cavity 16 of housing 12 with fluid flow from solenoid valve 14 into cavity 16. In this second or open position, the compressed air CA pressure inside interior area 26 of pressure vessel 24 and inside interior area 22 of housing 12 are less than that of the fluid pressure inside cavity 16.

A method of using the subject pulse valve device 10 for cleaning at least a portion of a filter unit comprises decreasing fluid F pressure within cavity 16 of a valve housing 12 to cause pressure movement of a plunge 18 into a first "closed" position blocking flow of compressed air CA from a pressure vessel or compressed air tank 24 through a nozzle pipe 28 in fluid connection with an operating filter unit. Increasing fluid F pressure within cavity 16 of the valve housing 12 likewise causes pressure movement of the plunge 18 into a second "open" position enabling flow of compressed air CA from the pressure vessel or compressed air tank 24, through openings 32a, interior area 22, ducts 22a and into nozzle pipe 28 for a pulse of CA for cleaning of the filter unit of a buildup of a dust cake.

For purposes of this method, the compressed air CA in the pressure vessel 24 has a pressure of about 10 psi to about 100 psi, or about 60 psi. When the plunge 18 is in the first closed position, the fluid F pressure within the cavity 16 of the housing 12 is significantly less than that of the compressed air CA within the pressure vessel or compressed air tank 24. When the plunge 18 is in the second open position, the fluid F pressure within the cavity 16 of the housing 12 is significantly greater than that of the compressed air CA within the pressure vessel 24. Pressure within the housing 12 cavity 16 is controlled using a solenoid valve 14 or the like for purposes of the subject method to control fluid F flow to the cavity 16 of the housing 12 and to thus control the movement of plunge 18 and compressed air CA flow to nozzle pipe 28.

The subject method further comprises providing a dampening mechanism 30 comprising one or more cushions, within the housing 12 to reduce or cushion the impact between the housing 12 interior surface 42 and the plunge 18 free end 56 upon movement of the plunge 18 into the first closed position. Providing a dampening mechanism 30 as herein described also reduces the impact noise of the plunge 18 with the housing 12 upon movement of the plunge 18 into the first closed position. Likewise, since cavity 16 is relatively small, the noise created by resilient portion 62a contacting sealing seat 20a is relatively minor or quiet.

Additionally, dampening mechanism 30 enables the use of an increased tank pressure for increased filter area cleaning per cleaning valve without jeopardizing cleaning valve reliability. Without dampening mechanism 30, increased tank pressure jeopardizes cleaning valve reliability due to damage or wear caused by increased mechanical stresses from the resultant higher velocity impact of the plunge 18 with the housing 12. Dampening mechanism 30 cushions the impact of plunge 18 with housing 12 thus lessening mechanical stresses of such impacts and reducing damage or wear to the cleaning valve. Hence, with dampening mechanism 30, cleaning valve reliability is not jeopardized with increased tank pressure.

While preferred embodiments have been shown and described, various modifications and substitutions may be made thereto without departing from the spirit and scope of the invention. Accordingly, it is to be understood that the present invention has been described by way of illustration and not limitation.

I claim:

1. A valve device useful for pulsed compressed air cleaning of a filter unit comprising:
    a housing comprising a top connected to housing sides with free ends opposite the top defining an interior area with a plunge comprising a base connected to base sides with free ends opposite the base slidably positioned within the interior area for free ends of base sides contact with the top, with the housing arranged in an opening of a pressure vessel containing compressed air;
    a cavity defined by an extended portion of the top within the interior area;
    a hollow plug portion extending from an interior surface of the base between the base sides of the plunge to a connected resilient portion slidably positioned within the cavity;
    ducts through the hollow plug portion for fluid communication from the interior area, through the ducts, and through the hollow plug portion into a nozzle pipe;
    a plurality of openings in the housing sides, wherein the openings provide fluid communication between an inside of the pressure vessel and the interior area of the housing, for a flow of compressed air from the inside of the pressure vessel, through the plurality of openings, into the interior area of the housing, through the ducts, through the hollow plug portion and to the nozzle pipe useful for cleaning at least a portion of the filter unit when the plunge is in an open position; and
    a fluid supply on the housing for control of a flow of fluid to the cavity within the housing to cause movement of the resilient portion and the plunge to a closed position for blocking the plurality of openings and blocking the flow of compressed air from the pressure vessel through the openings, into the interior area of the housing, through the ducts, through the hollow plug portion and to the nozzle pipe.

2. The valve device of claim 1, wherein the compressed air in the pressure vessel has a pressure of about 10 psi to about 100 psi.

3. The valve device of claim 1, wherein when the plunge is in the closed position, the fluid pressure within the cavity of the housing is less than that of the compressed air within the pressure vessel.

4. The valve device of claim 1, wherein when the plunge is in the open position, the fluid pressure within the cavity of the housing is greater than that of the compressed air within the pressure vessel.

5. The valve device of claim 1, wherein the housing further comprises a dampening mechanism to reduce impact between the housing and the plunge upon movement of the plunge into the closed position.

6. The valve device of claim 1, wherein the housing further comprises a dampening mechanism for reducing impact noise of the plunge upon movement of the plunge into the closed position.

7. The valve device of claim 1, wherein the cavity of the housing is relatively small in comparison to the size of the valve device for reducing impact noise upon movement of the plunge into the closed position.

8. The valve device of claim 1, wherein the resilient portion reduces plunge impact noise upon movement of the plunge into the closed position.

9. The valve device of claim 1, further comprising a valve on the valve housing.

10. The valve device of claim 1, further comprising a solenoid valve on the housing for control of the flow of fluid to the cavity of the housing.

* * * * *